April 2, 1957 G. P. REINTJES 2,787,458
CHECKERWORK CHAMBER
Filed April 20, 1953 2 Sheets-Sheet 1

INVENTOR.
George P. Reintjes,
BY Kenneth M. Thorpe
Atty.

April 2, 1957  G. P. REINTJES  2,787,458
CHECKERWORK CHAMBER
Filed April 20, 1953  2 Sheets-Sheet 2

INVENTOR.
George P. Reintjes
BY Kenneth M. Thorpe
atty.

United States Patent Office 2,787,458
Patented Apr. 2, 1957

2,787,458

CHECKERWORK CHAMBER

George P. Reintjes, Kansas City, Mo.

Application April 20, 1953, Serial No. 349,853

1 Claim. (Cl. 263—51)

This invention relates to heat exchanging checkerwork for industrial uses, and is primarily intended to provide a structure in which hot gases and air to be heated, alternately pass through the flues in opposite directions, one of the objects of the invention being to provide a construction of this character having lance lanes at various elevations.

Another object of the invention is to produce a checkerwork having cylindrical flues to insure spiral flow of air or gas to increase the efficiency of the wiping action on the flues for heat transfer purposes whereby there are no corners or angles which impede gas flow. Rectilinear flues cause churning, turbulence and eddying of the air, and increase the tendency for solids and molten slag to lodge in these locations and cause a lowering in the rate of heat transfer.

A further object of the invention is to produce a construction of the above character provided with means whereby the tile forming each column may be interlocked against rotation or misalinement in relation to adjacent tile of the column.

With the general objects named in view and others as will hereinafter appear, the invention consists in certain novel and useful features of construction and combination of parts as hereinafter described and claimed; and in order that it may be fully understood, reference is to be had to the accompanying drawings, in which:

Figure 2:
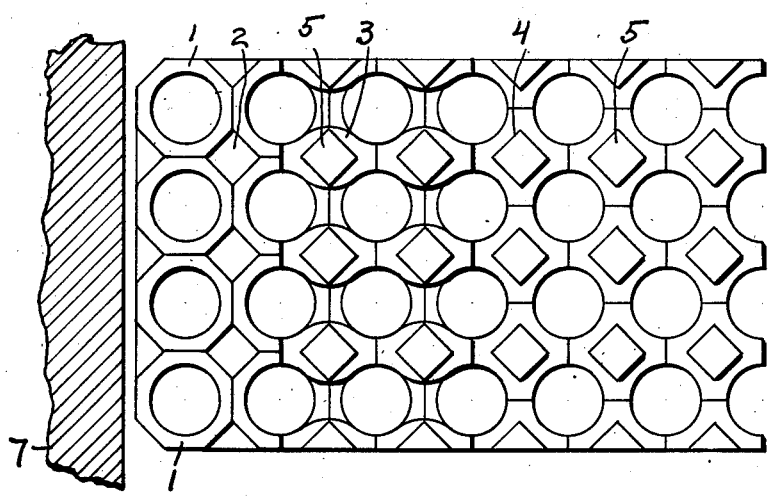
Figure 2 is a top plan view of the construction shown in Figure 1.
Figure 1:
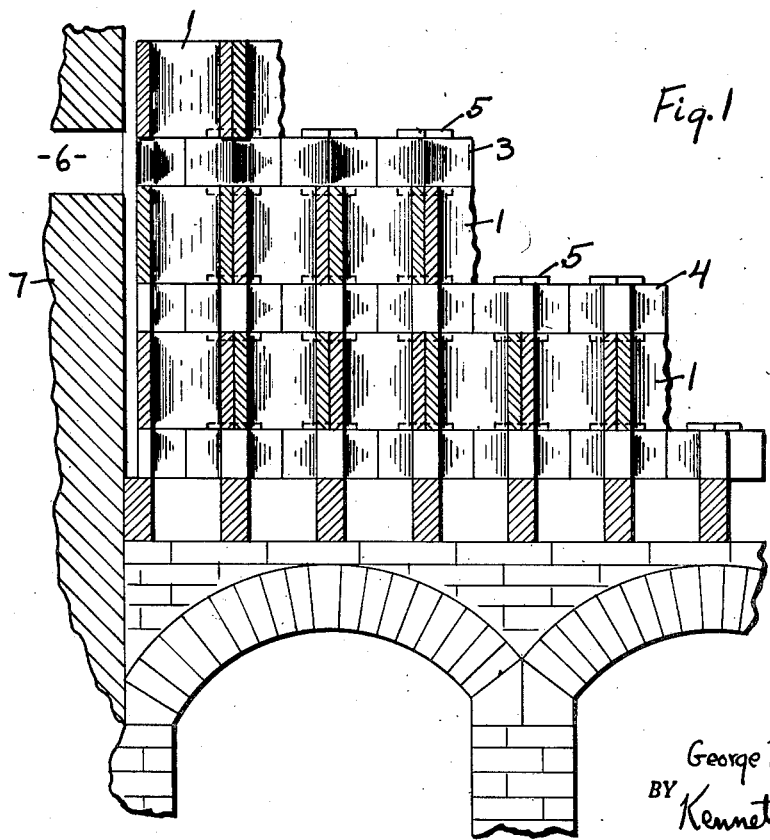
Figure 1 is a fragmental vertical section through a checkerwork chamber embodying the invention.
Figure 4:
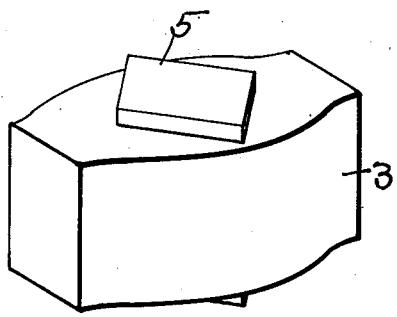
Figure 4 is a perspective view of one type of locking tile having a lug or lugs to fit the passageway between adjacent tile columns, said locking tile also providing a horizontal lance passageway as will hereinafter appear.
Figure 6:
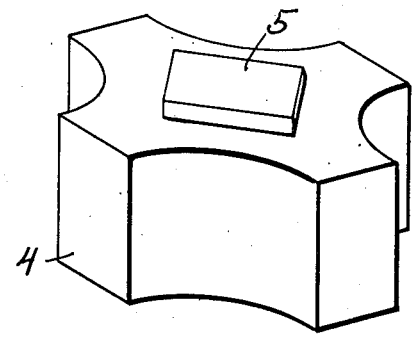
Figure 6 is a perspective view of a modified form of stop or locking tile in which horizontal communication in any direction between adjacent flues is prevented.
Figure 5:
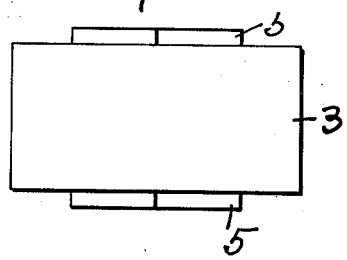
Figure 5 is a side view of the tile shown in Figure 4.
Figure 7:
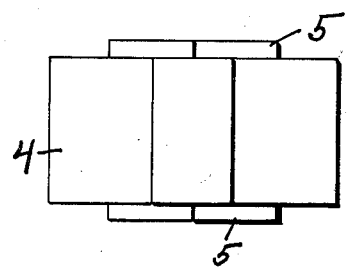
Figure 7 is a side view of the construction shown in Figure 6.
Figure 3:
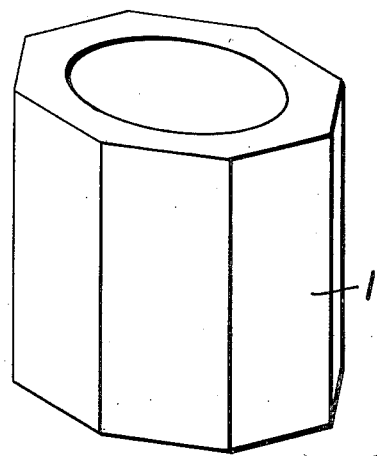
Figure 3 is a perspective view of one of the tile which are preferably externally rectilinear, illustrated as octagonal, and are formed with a center cylindrical flue.
Figure 8:
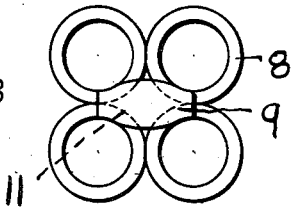
Figure 8 is a top plan view of a plurality of vertical columns of cylindrical tile both internally and externally, together with a locking stop tile to prevent lateral displacement.
Figure 9:
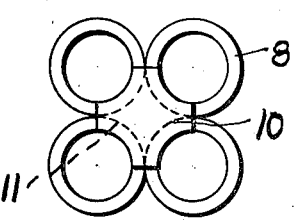
Figure 9 is a view similar to that of Figure 8, but with a lancing stop tile.
Figure 10:
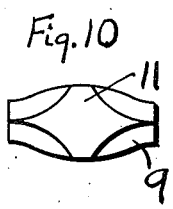
Figure 10 is a plan view of the stop tile shown in Figure 8.
Figure 11:
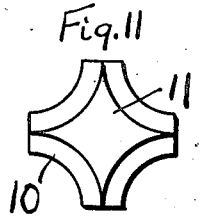
Figure 11 is a plan view of the stop tile shown in Figure 9.

In the said drawings, where like reference characters identify corresponding parts in all of the figures, 1 is the flue tile having an axial cylindrical bore or flue, with its exterior walls of rectilinear configuration, octagonal by preference. A series of these tile are stacked to form a plurality of adjacent vertical columns with the flats of the octagons in face to face relation. With this octagonal arrangement, a series of vertical cylindrical flues are provided and a series of parallel square passageways 2 are formed between adjacent tile.

Where such flue tile are positioned as described, the flow of gas or air in spiral relation and the relative movement or shifting due to expansion and contraction, tends to twist or offset the tile laterally. If this action is not restrained the columns are displaced so that eventually there will be a failure in the alinement of the tile and internal shoulders or offsets will be formed. To overcome this action, stop tile 3 and 4 (Figures 4 and 6 respectively), are positioned at desired elevations, each of said stop tile being formed on one or both faces with a rectilinear stop lug 5 which fits in the passageways 2 between the flue tile. With this arrangement it will be apparent that each tile column is locked as a unit from one end to the other and that no tile can rotate or shift laterally independently of the adjacent tile. At most elevations the cross shaped tile 4 of Figure 6 will be used, as this tile prevents cross circulation between adjacent flues. However, as it may be desired to provide for the lancing of the flues to effect cleaning, horizontal passages are provided by the use of spaced rows of tile 3 which are so positioned as to line up with lance ports 6 in the wall 7 of the checkerwork chamber.

In Figures 8 through 11, the application of the construction of the invention is shown in connection with internally and externally circular flue tile 8. The two types of stop tile 9 and 10, respectively correspond to tile 3 and 4 as previously described, for the purpose of providing lance lanes and to prevent lateral shift of the tile forming the flues. For this purpose the tile 9 and 10 are formed on one or both sides with locking lugs 11 which fit the space between the columns of flue tile 8.

From the above description, it will be apparent that I have produced a construction embodying all of the features of advantage set forth as desirable, and while I have described and illustrated the preferred embodiment, it is to be understood that I reserve the right to all changes within the spirit and scope of the appended claim.

I claim:

A checkerwork comprising a plurality of columns of identical tile arranged in two sets of rows at right angles to each other, with adjacent tile in each row in abutment, said tile columns forming internal vertical flues, a vertical passageway between tile columns arranged in two sets of rows at right angles and spaced midway between the rows of flues, and stop tile equal in length to the center to center spacing of the flues arranged in parallel rows at predetermined elevations, each stop tile having a lug fitting the vertical passageways between the tile of the columns.

References Cited in the file of this patent

UNITED STATES PATENTS

| 1,587,171 | Morton | June 1, 1926 |
| 2,257,392 | Milner | Sept. 30, 1941 |
| 2,428,461 | Kinney et al. | Oct. 7, 1947 |

FOREIGN PATENTS

| 694,430 | France | Sept. 15, 1930 |